United States Patent

Atoji et al.

[11] 4,160,280
[45] Jul. 3, 1979

[54] PICTURE SCANNER WITH A SCANNING LIGHT POSITION DETECTOR

[75] Inventors: Hitomi Atoji, Kyoto; Masuo Kunisawa, Uji; Riyo Shimooka; Seiji Okazaki, both of Kyoto, all of Japan

[73] Assignee: Dainippon Screen Seizo Kabushiki Kaisha, Japan

[21] Appl. No.: 854,698

[22] Filed: Nov. 25, 1977

[51] Int. Cl.$^2$ .............................................. H04N 1/24
[52] U.S. Cl. ..................................... 358/294; 358/289
[58] Field of Search .............. 358/285, 286, 289, 290, 358/294

[56] References Cited

U.S. PATENT DOCUMENTS

| | | | |
|---|---|---|---|
| 2,158,391 | 5/1939 | Wise | 358/289 |
| 2,295,572 | 9/1942 | Finch | 358/289 |
| 3,397,282 | 8/1968 | Iijima | 358/294 |
| 3,914,546 | 10/1975 | Hamaker et al. | 358/286 |

OTHER PUBLICATIONS

Oganov, Melnik-The Gazeta-2 Facsimile Set for Newspaper Transmission-Telecommun. Radio Engng., Pe. 1., vol. 25, #3, Mar., 1971.

*Primary Examiner*—Robert L. Griffin
*Assistant Examiner*—Joseph A. Orsino, Jr.

[57] ABSTRACT

A picture scanner using a light beam which has first passed through a mask plate to scan a picture fixed to a revolving cylinder is provided with a system for adjusting the transverse position of the light source, consisting of a mirror which can be pivoted into the path of the light beam, a screen on which an image of the light source and an image of the mask plate can be simultaneously projected, and means for focusing both these images into the same plane.

1 Claim, 3 Drawing Figures

PICTURE SCANNER WITH A SCANNING LIGHT POSITION DETECTOR

This invention relates to a picture scanner with a position detector for a scanning light source used in said picture scanner in an electronic color separation machine or the like.

Up to now, when a light source such as a halogen lamp was fitted in a picture scanner of this kind, the alignment of the light source on the optical axis of the machine was performed by moving the light source in the transverse plane to the optical axis, and the light source was placed where the output of a photo-electric transducer element such as a photomultiplier or the like arranged in a scanning head for picking up picture signals was the largest.

However, such a machine required much time to arrange the scanning light source on the optical axis, and further it was impossible to know directly whether the light source was arranged in a correct position or not.

Recent practice has been to change the scanning light source by using a cassette, and thereby the time for adjusting the source on the optical axis is much shortened. However, this procedure also has a defect in that it is quite difficult to know whether the light source is arranged in a correct position or not, because of the unavoidable variation of the relative position of the socket of the light source and the filament due to manufacturing tolerances.

Therefore, it is an object of the present invention to provide a picture scanner with a scanning light position detector which is free from the above-mentioned defects and using which the light source may be arranged in a correct position in a short time by a simple operation under direct observation of the actual position of the light source by eye.

This object is accomplished by a picture scanner with a scanning light position detector which comprises:

an original picture cylinder rotatable around its axis;

a light projector for scanning an original picture attached on the surface of the original picture cylinder, including in series along its optical axis a light source, a first projecting lens, a mask plate having an aperture, and a second projecting lens;

and a scanning head which receives a light beam from the original picture and includes in series a pick-up lens and a photoelectric transducer element on its optical axis;

wherein a screen and a pivot mirror are provided, and the pivot mirror is arranged between the pick-up lens and the photoelectric axis of the scanning head so as to divert the light beam onto the screen, and wherein the first projection lens is movable in the axial direction of the light projector so as to bring the image of the light source which it forms to focus in the same plane as that of the mask plate.

Other objects, features, and advantages of the present invention will be apparent from the following description of the present invention when taken in connection with the accompanying drawings, in which.

Figure 1:
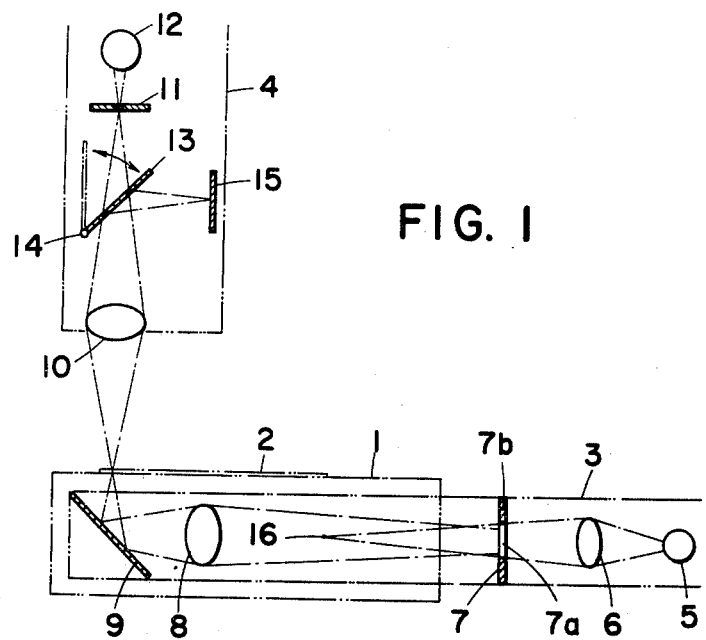
FIG. 1 is a schematic side view of a picture scanning machine comprising a position detector according to the present invention.

Referring to FIG. 1 of the drawing, there is shown an original picture cylinder 1, which has a hollow form, open at one end, is made of a transparent material and which rotates with a translucent original picture 2 attached to its outer surface.

A light projector 3 for scanning moves in and out of the picture cylinder 1 via the open end thereof and projects radially outwards a light beam through the original picture 2 attached to the cylinder 1.

A scanning head 4 is integrated with or co-operates with the light projector 3 and receives light from the illuminated portion of the original picture 2 and converts this light beam into an image signal.

The light projector 3 includes in series a scanning light source 5, a first projecting lens 6 which according to the present invention is movable in the axial direction of the projector 3, a mask plate 7 having an aperture 7a, a second projecting lens 8, and a reflecting mirror 9, all of which are arranged coaxially with the original picture cylinder 1.

The first projecting lens 6 converges the light beam projected from the light source 5, and is used for controlling the position of the image 16 of the light source 5 as hereinafter described.

Figure 2:
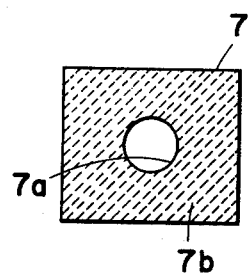
FIG. 2 is a view of a mask plate used in the position detector of the machine of FIG. 1.

The mask plate 7, as shown in FIG. 2, removes flare light from the light beam projected through the first projecting lens 6 from the light source 5. In the shown embodiment, the mask plate 7 includes a semi-transparent part 7b around the circular aperture 7a.

During the normal operation of the machine, i.e., during scanning, the lens 6 is in such a position that the image 16 of the light source 5 is formed at the focal point of the second projection lens 8, as shown in FIG. 1. Thus, after passing through the second projection lens 8, the light rays are parallel, and their illumination distribution is uniform. Then the rays are reflected off the reflecting mirror 9, which is placed at 45° to the axis of the picture cylinder 1 and form a light spot on the original picture 2 which is attached to the rotating picture cylinder 1.

The scanning head 4 includes in series a pick-up lens 10, a small aperture 11, and a photoelectric transducer element 12 along the optical axis of the light beam coming from the light spot on the original picture 2.

The pick-up lens 10 forms an image of the small portion of the picture 2 on the aperture 11. This image contains information, composed of color and intensity information, about that portion of the picture 2. The transducer element 12 then transduces that information into an electronic picture image signal.

The scanning of the original picture 2 is accomplished by moving the light projector 3 and the scanning head 4 simultaneously in the axial direction of the picture cylinder 1, while the picture cylinder 1 rotates. Thus electronic picture image signals corresponding to the various parts of the original picture 2 are produced in turn.

According to the present invention, there is further provided a pivot mirror 13 pivotally mounted in the scanning head 4 by a horizontal pivot shaft 14 perpendicularly skew to the optical axis of the scanning head 4. When scanning, the pivot mirror 13 is pivoted upwards so that it does not interfere with the passage of the light beam along the optical axis, and is not used. However, in FIG. 1, it is shown that the pivot mirror 13 can be pivoted down to an angle of 45° with respect to the optical axis of the scanning head 4, and in this position it can be used for aligning the light source 5 on the optical axis of the light projector 3, as hereinafter described. The pivot mirror 13, when in this position, reflects the light beam passing through the scanning head 4 onto the screen 15, where the operator of the machine can see it.

The screen 15 is the same distance away from the pivot mirror 13 as is the aperture 11, and hence the light spot on the original picture 2 and the screen 15 are conjugate with respect to the lens 10, when the mirror 13 is in use, just as are the light spot and the aperture 11, when the mirror 13 is not in use.

Now when a new light source 5 is being fitted, it is generally necessary to adjust its transverse position so that its filament lies precisely on the optical axis of the light projector 3. This alignment is performed as follows: The pivot mirror 13 is first pivoted to the position for use, as shown in FIG. 1. Then the first projection lens 6 is moved, according to another feature of the present invention, so that the image 16 of the filament 5 no longer lies at the focal point of the second projection lens 8. Instead, the image 16 is arranged to coincide with the mask plate 7.

Now, again according to the present invention, the position of the mask plate 7, which is fixed, is arranged to be conjugate with the light spot of the original picture 2 on the cylinder 1 with respect to the second projection lens 8 (with reflection off the mirror 9). Thus, when the machine is being used in this mode of adjusting the position of the filament 5, focused images 5' and 7a' both of the filament of the light source 5 and of the aperture 7a of the mask plate 7 appears on the screen 15, as shown in FIG. 3.

Figure 3:
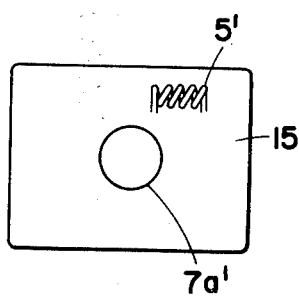
FIG. 3 is a view of a screen used in the position detector of the machine of FIG. 1, on which images of the aperture of the mask plate and the filament of the light source are being simultaneously projected.

FIG. 3 shows a case where the filament is not correctly adjusted on the optical axis of the light projector 3, and hence requires adjustment. It is clearly seen that the operator can with great facility adjust the position of the light source 5 by moving it transversely with respect to the optical axis of the light projector 3 while watching its image directly on the screen 15. Thus the time required for such adjustment can be greatly shortened.

What is claimed is:

1. A picture scanner with a scanning light position detector comprising:

an original picture cylinder rotatable around its axis;

a light projector for scanning an original picture attached on the surface of the original picture cylinder, including in series along its optical axis a light source, a first projecting lens, a mask plate having an aperture, and a second projecting lens;

and a scanning head which receives a light beam from the original picture and includes in series a pick-up lens and a photoelectric transducer element on its optical axis;

wherein a pivot mirror and a screen are provided, and the pivot mirror is arranged between the pick-up lens and the photoelectric transducer element and can be pivoted into the optical axis of the scanning head so as to divert the light beam onto the screen, and wherein the first projecting lens is movable in the axial direction of the light projector over a range including two positions, in one of which the first projecting lens forms an image of the light source at the focal point in front of the second projecting lens, said position being the normal operating position, and in the other position of which the first projecting lens forms an image of the light source in the plane of the mask plate, said other position being for lateral adjustment of the source, thus allowing an image of the light source superimposed on the mask to be projected onto the screen when the mirror is pivoted to the position where it diverts the light beam onto the screen.

* * * * *

UNITED STATES PATENT OFFICE
CERTIFICATE OF CORRECTION

Patent No. 4,160,280                    Dated July 3, 1979

Inventor(s) Hitomi Atoji, Masuo Kunisawa, Riyo Shimooka, Seiji Okazaki

It is certified that error appears in the above-identified patent and that said Letters Patent are hereby corrected as shown below:

IN THE TITLE PAGE:

Between line 9 and line 10 insert:

-- [30] Foreign Application Priority Data

November 25, 1976, Japan.............51-140734 -- .

Signed and Sealed this

Eighteenth Day of December 1979

[SEAL]

Attest:

SIDNEY A. DIAMOND

Attesting Officer      Commissioner of Patents and Trademarks